United States Patent

[11] 3,622,229

[72] Inventor Robert S. John, Jr. Deerfield, Ill.

[21] Appl. No. 5,824

[22] Filed Jan. 26, 1970

[45] Patented Nov. 23, 1971

[73] Assignee Bell & Howell Company Chicago, Ill.

[54] SOUND REPRODUCING UNIT START-STOP CONTROL CIRCUIT
17 Claims, 2 Drawing Figs.

[52] U.S. Cl. .......... 352/25, 179/100.2 S

[51] Int. Cl. .......... G03b 31/00

[50] Field of Search .......... 352/1, 12, 15, 16, 17, 25, 92; 179/100.2 S, 100.3 D, 100.4 D

[56] References Cited

UNITED STATES PATENTS

| | | | |
|---|---|---|---|
| 2,535,497 | 12/1950 | Jones | 179/100.2 S |
| 2,813,452 | 11/1957 | Laube | 352/92 |
| 3,222,597 | 12/1965 | Beatenbough et al. | 179/100.2 S |
| 3,330,915 | 7/1967 | Roberts | 179/100.2 S |

*Primary Examiner*—S. Clement Swisher

*Attorneys*—William F. Pinsak, John E. Peele, Jr., Kenneth W. Greb and William K. Serp

ABSTRACT: Start-stop control circuit for sound reproducing units arranged to be started by a start signal from a motion picture projector and stopped by stop signals reproduced from a record medium such as a magnetic tape, the stop signals being in the form of trains of pulses. Control means, preferably including a feedback capacitor circuit, are arranged to prevent stopping of drive means of the sound reproducing unit for a certain time interval after starting thereof.

Figure 1:
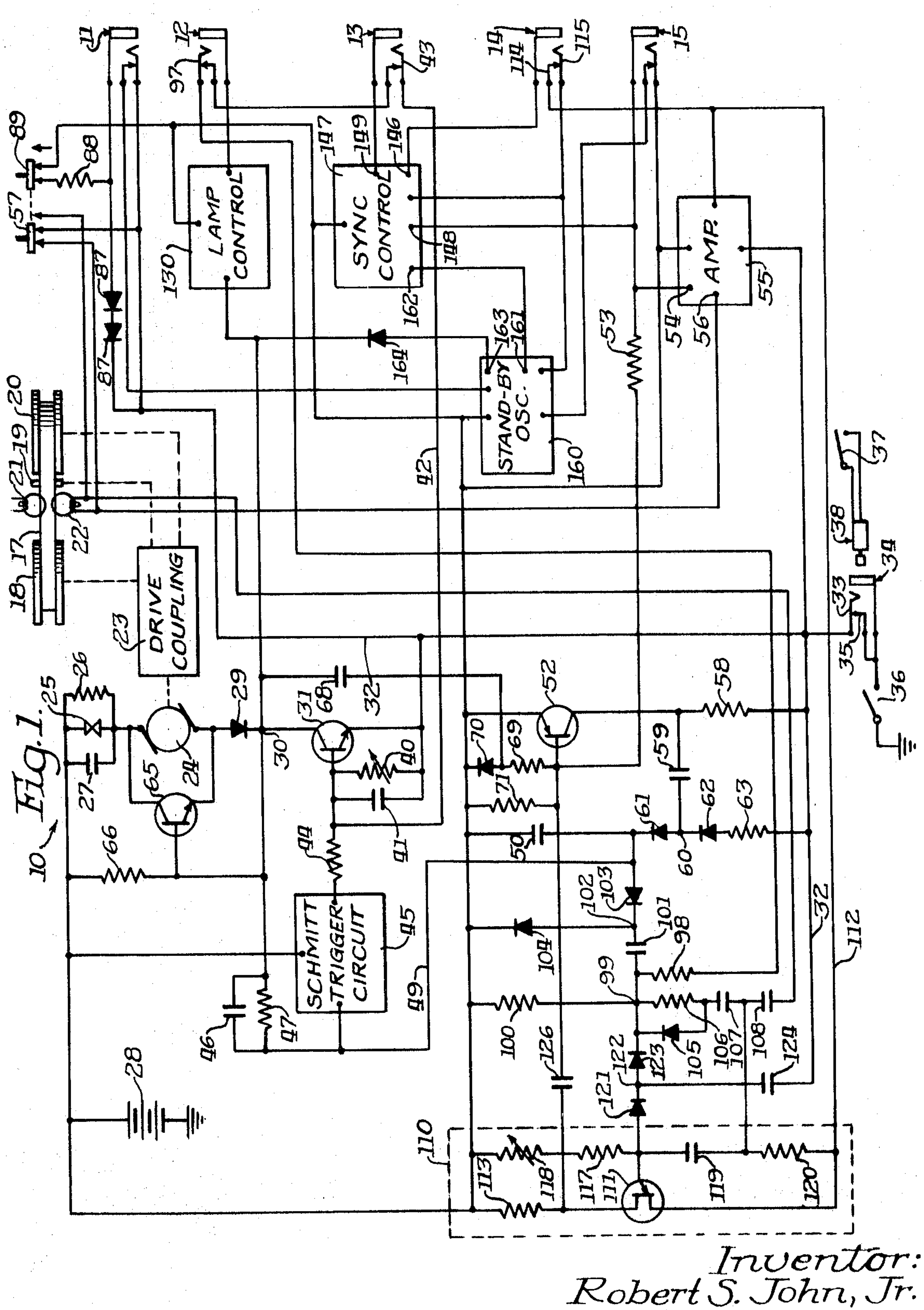

Inventor:
Robert S. John, Jr.

By William F. [signature] Atty

Inventor:
Robert S. John, Jr.

By William L. [signature] Atty

SOUND REPRODUCING UNIT START-STOP CONTROL CIRCUIT

This invention relates to a sound reproducing unit start-stop control circuit and more particularly to a circuit having a comparatively simple and inexpensive control arrangement which provides a high degree of reliability, allows considerable latitude in choice of design parameters and permits interchange of tapes or other record media from one unit to another.

The circuit of this invention has other applications but was especially designed for use in a system in which a sound reproducing unit, preferably a magnetic tape unit, is arranged to reproduce sound in synchronism with the projection of a motion picture sequence. Such systems are generally arranged in a manner such that the sound need not be recorded during an entire reel of film but only during selected sequences and to avoid unnecessary use of the magnetic tape, start marks are provided on the film at the beginning of each sequence and a stop signal is recorded on a control track of the magnetic tape. Synchronizing signals may also be recorded on the control track of the tape, for use during projection of the film and reproduction of the sound, to synchronize the operation of the projector with the operation of the sound unit. The stop signals are preferably in the form of trains of pulses and, in any case, have a substantial duration.

It is found that in some cases, the sound unit may be stopped so rapidly that the stop signal is not completely reproduced. Then, upon starting, the remainder of the stop signal is reproduced and the unit is again stopped. This operation is likely to take place particularly with improved tape units having fast stopping characteristics.

This invention was evolved with the general object of overcoming the disadvantages of prior circuits and of providing a circuit which will operate with a high degree of reliability.

Another object of the invention is to provide a control circuit which is highly reliable and yet comparatively simple in operation and inexpensive to manufacture.

A further object of the invention is to provide sound reproducing units which can operate with tapes or other record media produced on other units, to permit interchange of the tapes or other record media.

According to this invention, start and stop means are provided responsive to start signals for starting sound reproducing unit drive means and responsive to reproduced stop signals for stopping the sound reproducing unit drive means, and control means arranged to control the start and stop means to prevent stopping of the drive means for a certain time interval after starting thereof. The duration of the time interval preferably has an order of magnitude at least as great as the order of magnitude of the duration of the stop signals less the times required for starting and stopping of the record medium. With this arrangement, continued operation of the drive means is insured following each start signal and the drive means is stopped only in response to a reproduced stop signal. The arrangement permits greater flexibility in design, and the interchange of tapes.

In accordance with specific features of the invention, the control means comprises a feedback coupling capacitor arranged to apply a bias voltage to prevent stopping of the drive means, resistance means being connected in circuit with the capacitor for changing the charge thereof and to remove the bias voltage after a certain time interval. Diode means are connected in circuit with the capacitor means for preventing application of a reverse bias voltage during stopping and to insure proper operation.

Figure 2:
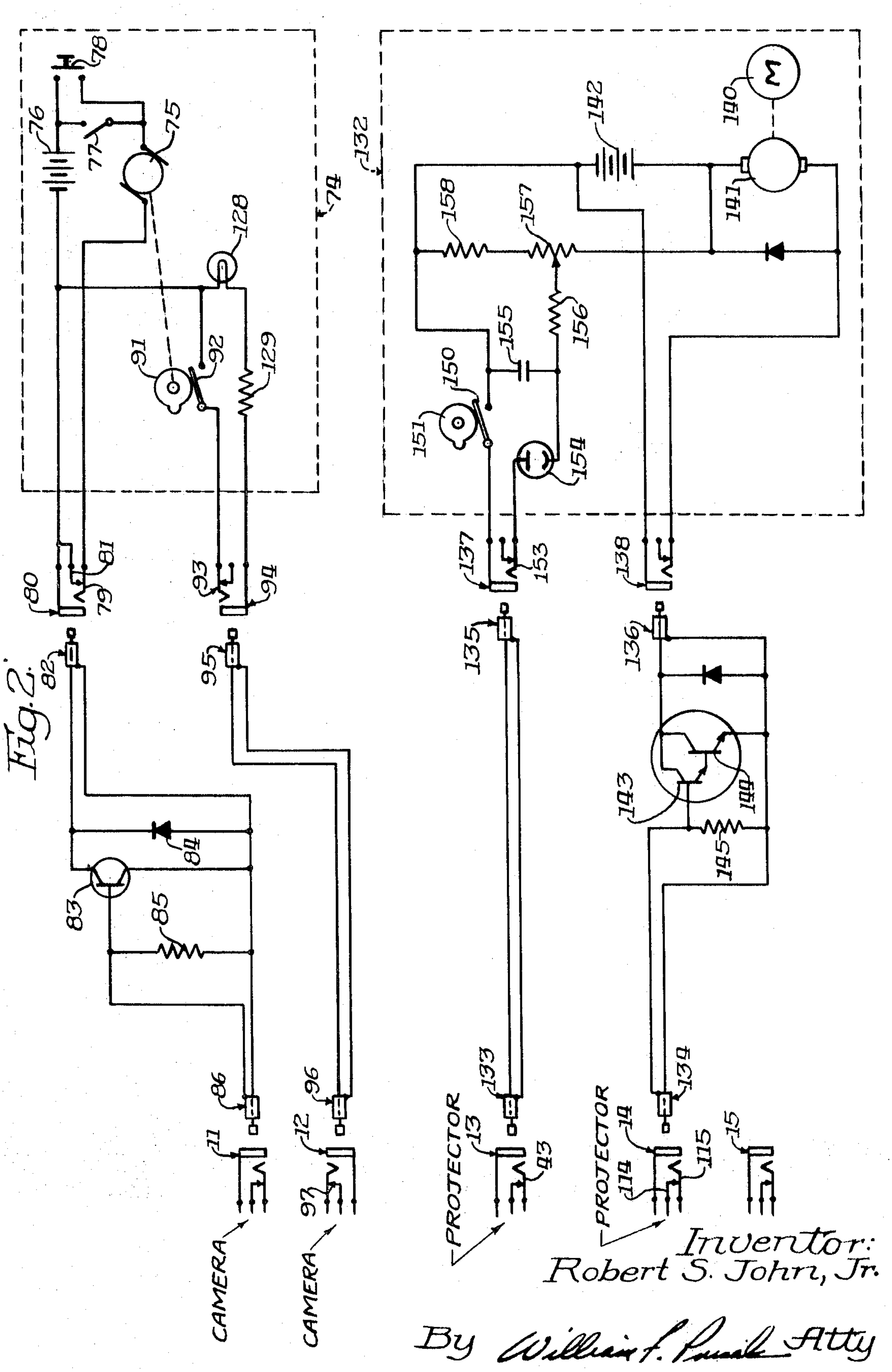

Preferably, the capacitor is connected in circuit between the base of a transistor used for amplifying stop pulses and a circuit point between an electric drive motor and electric switch means used to control energization of the motor. Most preferably, the bias voltage developed is used to saturate the transistor to prevent amplification of the stop pulses. This invention contemplates other objects, features and advantages which will become more fully apparent from the following detailed description taken in conjunction with the accompanying drawings which illustrate a preferred embodiment and in which:

FIG. 1 is a schematic diagram showing start-stop control circuitry of a sound recording-reproducing unit, constructed in accordance with this invention, and also showing circuitry for the recording of synchronizing and stop signals and for controlling the synchronized operation of a motion picture projector; and FIG. 2 is a schematic diagram showing the connection of the circuitry of FIG. 1 to a camera and a projector.

Reference numeral 10 generally designates a sound recording-reproducing unit and associated circuitry which includes an improved start-stop control circuit in accordance with this invention. The circuitry includes jacks 11–15. As shown in FIG. 2 jacks 11 and 12 are arranged for connection to a camera and jacks 13 and 14 are arranged for connection to a projector. Jack 15 is arranged for connection to a slide projector, but the connections are not shown because it is not necessary to an understanding of the invention.

The operation of the overall system is described in detail hereinafter but because the invention is concerned primarily with the starting and stopping operation of the sound recording-reproducing unit, the circuitry involved will be first described. In general however, it is noted that when a camera is used, synchronizing pulses are supplied from the camera to be recorded on a control track of a magnetic tape while audio signals are recorded on an audio track of the tape. In response to the first few synchronizing pulses, the drive of the tape is started while a lamp is energized to record a start mark on the film. When the synchronizing pulses stop, a burst of relatively high-frequency pulses are recorded on the control track and the drive of the tape is then stopped. When a projector is used, the start mark on the film is sensed by a photocell, and the drive of the tape is started. Reproduced synchronizing signals from the tape are compared with feedback signals from the projector to develop a control signal used to control the speed of drive of the projector. When the reproduced stop pulses are detected, the drive of the tape is stopped, and in response to the next start mark, the start and stop sequence is repeated.

In the sound recording-reproducing unit, a magnetic tape 17 is moved from a supply reel 18 over a capstan 19 to a takeup reel 20, the tape being engaged by an audio track head 21 and a control track head 22, the audio track head 21 and a control track head 22, the audio track head 21 being connectable to conventional circuitry, not shown, for recording and reproducing of audio signals, The reel 18, capstan 19 and reel 20 are connectable through a conventional drive coupling 23 to a DC drive motor 24. One terminal of the motor 24 is connected through a governor 25, a resistor 26 and a capacitor 27 to the positive terminal of a battery 28 having a negative terminal connected to ground. The other terminal of the motor 24 is connected through a diode 29 to a circuit point 30 which is connected to the collector of a transistor 31, the emitter of which is connected to a line 32 which is connected to ground at times when energization of the motor 24 is desired. The transistor 31 operates an electronic switch to energize or deenergize the motor 24 by control of the voltage applied to the base of the transistor 31. To connect line 32 to ground, it is connected to one contact 33 of a jack 34, a second contact 35 and the shell of the jack being connected through a switch 36 to ground. A remote switch 37 is connectable through a plug 38 to the jack 34, contacts 33 and 35 being disengaged when the plug 38 is inserted, so that operation is then controlled by the remote switch 37.

The base of the transistor 31 is connected through an adjustable resistor 40 and a capacitor 41 to a line 32 and is also connected through a line 42 to a contact 43 of the jack 13, which is connected to a photocell start mark sensing circuit of a projector, a positive voltage being applied to the base of the transistor 31 in response to a start mark to render the transistor 31 highly conductive and to energize the tape drive motor 24. The base of the transistor 31 is also connected through a resistor 44 to an output of a Schmitt trigger circuit 45. The input of the Schmitt trigger circuit 45 is connected to the collector of the transistor 31 through a capacitor 46 and a resistor 47 in parallel. Capacitor 46 and resistor 47 form a feedback circuit which, when the transistor 31 is rendered conductive by the start signal on line 42, triggers the circuit 45 to a condition such as to maintain conduction of the transistor 31.

The input of the Schmitt trigger circuit 45 is additionally connected through a line 49 to one terminal of a capacitor 50 the other terminal of which is connected to the positive terminal of the battery 28. Capacitor 50 forms part of both a start counter circuit and a stop counter circuit. The Schmitt trigger circuit 45 is triggered between an "on" condition in which the transistor 31 is conductive and an "off" condition in which the transistor 31 is nonconductive, in accordance with the level of charge of the capacitor 50.

The stop counter circuit comprises a transistor 52 which functions to amplify stop pulses reproduced from the magnetic tape, in the projection operation, or generated from an oscillator during operation with a camera. To apply the reproduced stop pulses, the base of the transistor 52 is connected through a resistor 53 to an output terminal 54 of an amplifier 55 having an input terminal 56 connected to one terminal of the control track head 22. The other terminal of the head 22 is connected through a slide switch contact 57 (when it is in a reproduce position) to the line 32 which is grounded through switches 36 or 37 as above described. Thus, in the sound reproducing, film-projecting operation, reproduced and amplified stop pulses are applied to the base of the transistor 52. The emitter of the transistor 52 is connected to the positive terminal of the battery 28 while the collector thereof is connected through a resistor 58 to the line 32 and through a capacitor 59 to a circuit point 60 which is connected through a diode 61 to the line 49 and through a diode 62 and a resistor 63 to the line 32. The reproduced and amplified stop pulses are of negative polarity at the base of the transistor 52 and corresponding positive pulses are produced at the collector thereof which are applied through the coupling capacitor 59 and the diode 61 to the line 49 to progressively change the level of charge of the capacitor 50. After a certain number of stop pulses are applied, the level of charge of the capacitor 50 is changed to an extent such that the Schmitt trigger circuit shifts from an "on" condition to an "off" condition, to render the transistor 31 nonconductive and to deenergize the motor 24.

When motor 24 is deenergized, a brake circuit is brought into operation. In particular, a transistor 65 is provided having its collector and its emitter connected to opposite terminals of the motor, the base of the transistor 65 being connected to the circuit point 30 and through a resistor 66 to the positive terminal of the battery 28. When the transistor 31 is conductive, a bias is developed across the diode 29 which prevents conduction of the transistor 65. However, when the transistor 31 is nonconductive, the bias is removed and the transistor 65 conducts heavily to absorb the energy developed by the motor, then operating as a generator, and to decelerate the motor more rapidly. The illustrated brake circuit is a one-stage circuit and in some cases, a two-stage circuit may be used to increase the speed of braking. In either case, the tape may be brought to a standstill before reproduction of a complete burst or train of stop pulses. If so, when the motor 24 is restarted in response to a new start signal from the film projector, the remaining part of the burst or train of the stop pulses will be reproduced and the stop counter circuit will operate to trigger the circuit 45 and to deenergize the motor 24, thus bringing the tape to an abrupt stop. This of course is not the desired operation, since it is desired to wait until the next train of stop pulses, before again stopping the tape drive.

In accordance with this invention, means are arranged for controlling the circuit to prevent stopping of the tape drive means for a certain time interval after starting thereof. In particular, feedback coupling means are arranged to apply a feedback signal. The feedback coupling means, in the illustrated circuit, comprises a capacitor 68 having one terminal connected to the circuit point 30 and its other terminal connected through a resistor 69 to the base of the transistor 52 and through a diode 70 to the positive terminal of the battery 28. When the motor 24 is deenergized, the potential of the circuit point 30 is close to the potential of the positive terminal of the battery 28, but when the motor 24 is energized by heavy conduction through the transistor 31, the potential of the circuit point 30 drops to a value close to ground potential and, since the voltage across the capacitor 68 cannot change instantaneously, the potential of the base of the transistor 52 drops to a relatively low value, causing saturation current to flow through the transistor 52. As a result, the stop pulses are not amplified by the transistor 52 and the stopping action as above described cannot occur. However, the capacitor 68 is gradually charged by current flow through the resistor 69 and a resistor 71, connected between the base of the transistor 52 and the positive terminal of the battery 28. When the capacitor 68 becomes charged sufficiently, the transistor 52 can again function to amplify the stop pulses. The values of the capacitor 68 and the resistors 69 and 71 should be such as to provide a relatively long time constant. By way of example, the capacitor 68 may have a capacitance of 50 microfarads, resistor 69 may have a resistance of 3,900 ohms and resistor 71 may have a resistance of 2,200 ohms. With such values a time delay on the order of about 1/3 of a second is obtained between the application of a start signal to the transistor 31 and the time at which the transistor 52 can function to amplify stop pulses.

In the stopping operation, the potential of the circuit point 30 may shift in a positive direction from a relatively low value, and diode 70 prevents the left terminal of the capacitor 68 from exceeding the potential of the positive terminal battery 28 to prevent cutoff of the transistor 52 and to also aid in resetting of the charge of the capacitor 68 for the next starting operation.

the circuit is highly advantageous in that it insures that proper operation is obtained with a high degree of reliability, permits use of tapes recorded on another unit to be used even though the duration of the stop signal is quite great and otherwise provides considerable flexibility and latitude. At the same time, it does not interfere with other operations performed with the circuitry. Such operations will now be described with reference to the sequences of operation with a camera and with a projector.

Referring first to FIG. 2, a camera 74 is shown diagrammatically which comprises a drive motor 75 having one terminal connected to the positive terminal of a battery 76 either through a switch 77 or a pushbutton switch 78. The other terminal of the motor 75 is connected to a contact 79 being connected, with no plug in the jack 80, to a contact 81 which is connected to the negative terminal of the battery 76. Thus, the motor 75 may then be operated by closing either the switch 77 or the switch 78. When a plug 82 is inserted in the jack 80, the contact 79 is connected to the collector of a transistor 83 while the negative terminal of the battery 76 is connected to the emitter of the transistor 83, a reversely poled diode 84 being connected between the collector and emitter of transistor 83. The base and emitter of the transistor 83 are connected together through a resistor 85 and are connected to a plug 86 arranged to be inserted in the jack 11. When so inserted, the base of the transistor 83 is connected through diodes 87 to the line 32 and through a resistor 88 and a slide switch contact 89 to the positive terminal of battery 28. Thus a positive bias is applied to the base of the transistor 83 and when either the switch 77 or the switch 78 is closed, the motor 75 may be energized.

When motor 75 is energized a cam 91 is rotated to periodically close a switch 92 which may be accomplished during each frame or during every succession of two, three or N image frames. Switch 92 is connected between the negative terminal of battery 76 (which is connected to ground through the low impedance of the transistor 83) and a contact 93 of a jack 94 which is interconnected with the jack 12 through plugs 95 and 96 and an interconnecting cable. With the plugs 95 and 96 inserted, contact 93 is connected to a contact 97 of the jack 12 which is connected through a resistor 98 to a circuit point 99 connected through a resistor 100 to the positive terminal of the battery 28 and connected through a capacitor 101 to a circuit point 102. Circuit point 102 is connected through a diode 103 to the line 49 and is connected through another diode 103 to the line 49 and is connected through another diode 104 to the positive terminal of the battery 28. When the contact 92 is momentarily closed, a negative-going pulse is developed at the circuit point 99 which is applied through the coupling capacitor 101 and the diode 103 to the line 49, charging the capacitor 50.

When the capacitor 50 is charged sufficiently, the Schmitt trigger circuit 45 is triggered to a "on" condition and the transistor 31 is rendered conductive to energize the motor 24 and to drive the tape 17. It is noted that when the negative-going pulse is applied through capacitor 101 nd diode 103 to the capacitor 50, the charge of the capacitor 101 is increased and at the end of the pulse, the capacitor 101 may discharge through the diode 104 to fix the level at which the capacitor 101 is charged wen the next pulse is applied. Capacitor 101 and diodes 103 and 104 together with he capacitor 50 operate as a start counter.

The negative-going pulses developed at the circuit point 99 are also applied through the parallel combination of a diode 105 and a resistor 106 and capacitors 107 and 108 in series to the control track head 22 to record such pulses on the control track of the tape. The recorded pulses, as will be described, are used in synchronizing the operation of the projector.

The negative-going pulses developed at circuit point 99 are additionally used to inhibit operation of a stop signal oscillator generally designated by reference numeral 110. Oscillator 110 comprises a unijunction transistor 111 having one base connected to a line 112 and a second base connected through a resistor 113 to the positive terminal of battery 28. Line 112 is connected to a contact 114 of the jack 14 which with no plug inserted is connected to a contact 115, connected through the switch 36 to ground. The emitter of the transistor 111 is connected through a fixed resistor 117 and an adjustable resistor 118 to the positive terminal of the battery 28 and is also connected through a capacitor 119 to the junction between capacitors 107 and 108 which is connected through a resistor 120 to the line 112. The capacitor 119 is charged through the resistors 117 and 118 and when the voltage reaches a certain level, the transistor 111 conducts to discharge the capacitor 119 and to develop a negative-going pulse at the second base. Such pulses are developed at a relatively high rate, as compared to the frame rate. For example, the pulses may be developed at a rate on the order of 1.5 Hz.

To inhibit operation of the oscillator 110 the emitter of the transistor 111 is connected through a diode 121 to a circuit point 122 which is connected through a diode 123 to the circuit point 99 and through a capacitor 124 to the line 32. The negative-going pulses at the circuit point 99 serve to keep the charge of the capacitor 124 below a certain level and to prevent the capacitor 119 from being charged to a level sufficient for conduction of the transistor 111. However, when the camera is stopped the negative-going pulses are no longer developed at the circuit point 99 and the oscillator 110 is allowed to operate. Such pulses are applied from the second base of the transistor 111 and through a coupling capacitor 126 to the base of the stop signal amplifying transistor 52. The pulses are counted through the operation as previously described to discharge the capacitor 50, to cause the circuit 45 to shift to its "off" condition and to deenergize the motor 24.

The camera includes a lamp 128 which is momentarily energized at the time when the tape drive motor 24 is energized, to record a start mark on the film. One terminal of the lamp 128 is connected to the negative terminal of the battery 76 while the other terminal thereof is connected through a resistor 129 to the shell of the jack 94, connected to the shell of the jack 12 which is connected to the output of a lamp control circuit 130. The input of the lamp control circuit 130 is connected to the circuit point 30. Accordingly, in response to operation of the camera, the tape 17 is driven while synchronizing pulses and audio signals are recorded on the control and audio tracks, a start mark being recorded on the film at the beginning of each sequence. At the end of each sequence, a stop signal in the form of a burst of relatively high-frequency pulses is recorded on the control track.

After developing the film and rewinding of the tape, the film may be run through a projector 132 while the audio signals are produced automatically. In this operation, plugs 86 and 96 are removed from the jacks 11 and 12 and plugs 133 and 134 are inserted in jacks 13 and 14 while interconnected plugs 135 and 136 are inserted in jacks 137 and 138 of the projector 132.

The projector 132 comprises a drive motor 140, energized by suitable means, not shown, to drive the projector mechanism. To control the speed, an electromagnetic brake 141 is connected to the motor 140. One terminal of the brake 141 is connected to the positive terminal of a battery 142 while the other terminal thereof is connected through jack 138 and plug 136 to the collectors of a pair of transistors 143 and 144 connected in a Darlington circuit, the emitter of transistor 143 being connected to the base of transistor 144. The emitter of transistor 144 is connected through plug 136 and jack 138 to the negative terminal of battery 142. The base of the transistor 143 is connected through a resistor 145 to the emitter of transistor 144 and is also connected through the plug 134 and the jack 14 to an output terminal 146 of a synchronizing control circuit 147. The emitter of the transistor 144 and also the negative terminal of the battery 142 are connected to the contact 115 of the jack 14 which is connected through the switch 36 to ground. The synchronizing control circuit 147 has one input 148 connected to the output terminal 54 of the amplifier 55, reproduced synchronizing pulses being applied to the terminal 148. A second input terminal 149 is connected through jack 13, plug 133, plug 135 jack 137 and a switch 150 to the negative terminal of the battery 142. Switch 150 is operated by a cam 151 driven from the projector drive mechanism. The synchronizing control circuit 47 compares the feedback pulses developed by periodic closure of the switch 150 with the reproduced synchronizing pulses and develops an output signal at terminal 146 which is applied to the base of the transistor 143 to control the energization of the brake 141 and to automatically control the speed of drive of the projector drive mechanism, thereby synchronizing the operation of the projector with the drive of the tape 17.

To supply the start signal at contact 43 of jack 13, it is connected through the plugs 133 and 135 to a contact 153 which is connected through a photocell 154 to a circuit point connected through a capacitor 155 to the negative terminal of battery 142 and connected through a resistor 156 to the movable contact of a potentiometer 157 having one terminal connected to the positive terminal of battery 142 and a second terminal connected through a resistor 158 to the negative terminal of battery 142. The photocell 154 is rendered conductive in response to a start mark on the film to develop a positive pulse which is applied to the base of the transistor 31 to initiate conduction thereof in the manner as previously described.

A standby oscillator 160 is provided for supplying synchronizing pulses to the synchronizing control circuit 147 when the motor 24 is deenergized, an output terminal 161 of the oscillator 160 being connected to an input terminal 162 of the synchronizing control circuit 147. To inhibit operation of the oscillator 160 when the motor 24 is energized, a terminal 163 of the oscillator is connected through a diode 164 to the circuit point 30. When transistor 31 is conductive to energize the motor 24, the potential of the circuit point 30 is at a relatively low value and through the diode 164, the potential of the circuit of the terminal 163 is clamped to a corresponding low potential which prevents operation of the oscillator 160. The oscillator 160 supplies pulses at a rate corresponding to a predetermined average or typical rate of synchronization pulses.

It will be understood that modifications and variations may be effected without departing from the spirit and scope of the novel concepts of this invention.

I claim as my invention:

1. In a circuit for controlling a sound reproducing unit which includes drive means for driving the record medium having sound signals and at least one stop signal recorded thereon, means for reproducing stop signals from said medium, means providing a start signal of a short duration and start and stop means responsive to said start signals for starting said drive means and responsive to a reproduced stop signal for stopping and drive means control means arranged for controlling said start and stop means and timing means included in said control means to prevent stopping of said drive means for a predetermined time interval after starting thereof the operation of said timing means being independent the duration of said start signals.

2. In a circuit as defined in claim 1, said control means including feedback coupling means arranged to apply a feedback bias signal to said start and stop means to prevent stopping of said drive means for said predetermined time interval after starting thereof.

3. In acircuit as defined in claim 2, said feedback coupling means including feedback coupling capacitor means arranged to apply a bias voltage to said start and stop means to prevent stopping of said drive means, and resistance means in circuit with said feedback coupling capacitor means for changing the charge thereof and to remove said bias voltage after said certain time interval.

4. In a circuit as defined in claim 3, diode means in circuit with said feedback coupling capacitor means for preventing application of a reverse bias voltage to said start and stop means in response to stopping of said drive means.

5. In a circuit as defined in claim 1, said drive means comprising an electric motor, said start and stop means comprising a electronic switch means in series with said motor, means responsive to said start signals for closing said electronic switch means, and means responsive to said stop signals for opening said electronic switch means.

6. In a circuit as defined in claim 5, said control means comprising feedback coupling capacitor means connected to a circuit point between said electronic switch means and said motor and arranged to respond to closing of said electronic switch means to apply a bias voltage to said start and stop means to prevent opening of said switch means, and resistance means in circuit with said feedback coupling capacitor means for changing the charge thereof and to remove said bias voltage after said certain time interval.

7. In a circuit as defined in claim 6, said start and stop means comprising an amplifier device arranged to amplify said stop signals, and said coupling capacitor means being connected to apply said bias voltage to said amplifier device to disable said amplifier device.

8. In a circuit as defined in claim 7, said amplifier device being a transistor. and said bias voltage being applied to saturate said transistor.

9. In a circuit as defined in claim 5, said start and stop means comprising second electronic switch means in parallel with said motor, and means responsive to opening of the first switch means for closing said second electronic switch means.

10. In a c circuit as defined in claim 1, said start and stop means comprising an amplifier device arranged to amplify said stop signals, and said control means comprising means for disabling said amplifier device when said drive means is started.

11. In a circuit as defined in claim 1, wherein said stop signals have a duration of a certain order of magnitude, the duration of said certain time interval being of an order of magnitude at least as great as said certain order of magnitude less the times required for starting and stopping of said record medium.

12. In a circuit as defined in claim 11, said stop signals being in the form of trains of stop pulses, and start and stop means comprising stop counter means responsive to a certain number of said pulses for effecting stopping of said drive means.

13. In a circuit as defined in claim 12, said stop counter means comprising capacitor means, and amplifier means responsive to said stop pulses for progressively changing the charge of said capacitor means.

14. In a circuit as defined in claim 13, said start and stop means comprising a Schmitt trigger circuit responsive to a certain level of charge of said capacitor means for controlling stopping of said drive means.

15. In a circuit as defined in claim 13, said drive means comprising an electric motor, said start and stop means comprising electronic switch means in series with said motor, means responsive to said start signals for closing said electronic switch means, and means responsive to a certain level of charge across said capacitor means for opening said switch means.

16. In a circuit as defined in claim 15 control means comprising feedback coupling capacitor means connected between the input of said amplifier means and a circuit point between said electronic switch means and said motor.

17. In a circuit as defined in claim 1, wherein synchronizing signals are recorded on the record medium to be reproduced for controlling film drive means of a motion picture projector which includes means for developing a feedback synchronizing signal and means responsive to film marks for developing start signals, said circuit including means arranged for applying said start signals from the projector to said start and stop means, and synchronizing means arranged to respond to reproduced ans feedback signals for developing a film drive control signal.

* * * * *

UNITED STATES PATENT OFFICE

CERTIFICATE OF CORRECTION

Patent No. 3,622,229 Dated: November 23, 1971

Inventor(s) Robert S. John, Jr.

It is certified that error appears in the above-identified patent and that said Letters Patent are hereby corrected as shown below:

Column 7, Claim 1, line 17, please cancel "and" and insert -- said --.

Claim 1, line 21, please insert --of-- after "independent".

Signed and sealed this 9th day of May 1972.

(SEAL)
Attest:

EDWARD M.FLETCHER,JR.
Attesting Officer

ROBERT GOTTSCHALK
Commissioner of Patents

205